May 2, 1972  E. HOFF  3,660,279

METHOD FOR SORPTION OF ANTIBIOTICS FROM UNFILTERED LIQUIDS

Filed Feb. 10, 1970

United States Patent Office 3,660,279
Patented May 2, 1972

3,660,279
METHOD FOR SORPTION OF ANTIBIOTICS FROM UNFILTERED LIQUIDS
Erik Hoff, Oslo, Norway, assignor to A/S Apothekernes Laboratorium for Specialpraeparater, Oslo, Norway
Filed Feb. 10, 1970, Ser. No. 10,183
Claims priority, application Norway, Feb. 12, 1969, 566/69
Int. Cl. C02b 1/80
U.S. Cl. 210—19    5 Claims

ABSTRACT OF THE DISCLOSURE

A method for the sorption of an antibiotic from unfiltered liquids using at least one vessel having an inlet and an outlet from the liquids which comprises continuously feeding the unfiltered liquid into the vessel by means of said inlet, oscillating the vessel containing the sorbent particles horizontally around its own axis to provide horizontal movement with minimal axial movement to the sorbent particles and withdrawing effluent reduced in antibiotic concentration from the vessel by means of said outlet.

---

The production of antibiotics by fermentation results in a fermentation broth, in which the antibiotic is present in a mixture with several other substances as suspension. In order to separate the antibiotic, this suspension is processed according to the usual unit operations.

Sorption processes are among the separation procedures used. The sorbent may be ion exchangers, gel-types, macro-porous types, polymer sorbents, etc., usually packed in a sorbent bed. In order to prevent a filtering effect on the column, and in order to keep the sorbent surface active, a filtration of the fermentation suspension is normally required before feeding it through the bed, thus avoiding the blocking of the sorbent by solids. Further, because of partial blocking, channels may be formed and accordingly a desired chromatographic effect may be substantially reduced. On the other hand, the filtration requires equipment, space and cost of labour.

This invention is designed to eliminate the filtration as a sorption process is performed in order to avoid the mentioned disturbances. At the same time the method leads to a low height equivalent to a theoretical plate for the columns used. By the sorption technique of this invention, it is possible to draw a continuous stream from the fermentation process to the sorption process and to recycle the effluent to the fermentation process.

These advantages are achieved by the method given in the patent claims.

The principle of the invention is to oscillate horizontally the vessel or column containing the sorbent bed. The amplitudes of the oscillations may vary from a very small angle to several rotations in each direction. The frequency of the oscillations should range from 0.01 to 200 c.p.s. By this influence the sorbent particles obtain a rolling horizontal movement, which prevents solids from adhering to the sorbent and thus building up obstacles for the liquid flow. If liquid is fed to the bottom of the oscillated bed, a suitable flow rate may be chosen, sufficiently for keeping the solids in the suspension from depositing. At the same time, the upper part of the bed can be kept calm and without whirling of the sorbent.

The horizontal movement prevents effectively the forming of channels in the sorbent mass, and at the same time the axial mixing is neglectable. Chromatographically these two effects contribute to a favourable result.

Figure 1:
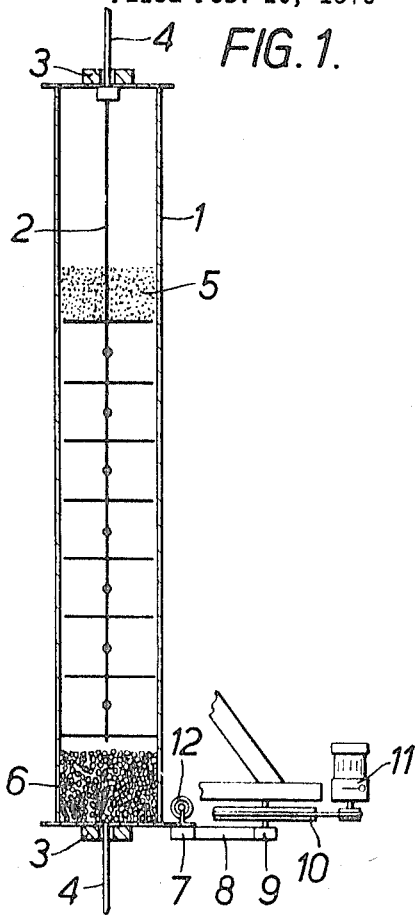

In the accompanying drawings there is shown in FIG. 1 a cross-sectional view of an oscillation column.

Figure 2:
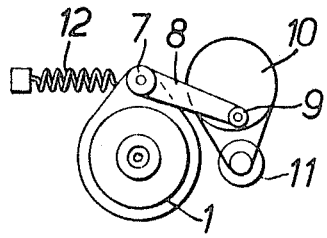
Figure 3:
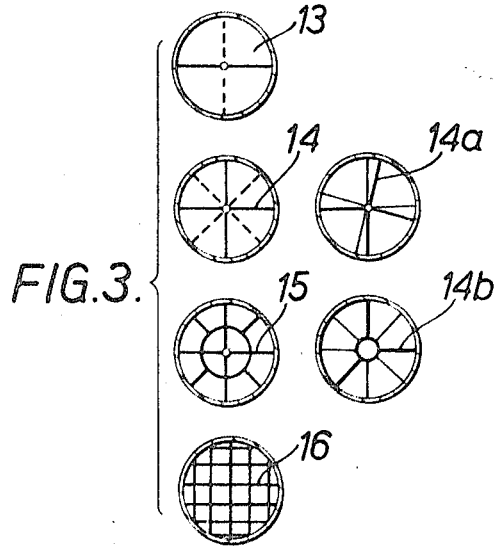

FIG. 2 is a top plan view of the same apparatus.
FIG. 3 illustrates various modifications to the interior of the oscillation column.

In the drawing is shown a principal design for an oscillating column, consisting of the column 1, supported in bearings 3 at the top and bottom, and supplied with power transmission from motor 11 via cone belt, fly wheel 10, excentric adjustable pin 9 and bearing, and crank shaft 8 connected with the column. In connection with these mechanical parts, the column may be fitted with torsional or spring loading 12. The column may contain thin stirring rods, baffles, plates, or other equipment of known design 13–16. Heat exchangers may be constructed in the form of tubes, jackets, etc. The liquid may be fed into the bottom of the column through a flexible connection 4. Inside the column the lower part is filled with supporting balls and a screen support for the sorbent mass 5. If necessary a sieve 6 preferably consisting of ceramic balls can be arranged.

Normally, each column is oscillated around its own axis, however, several columns may be mounted around a common axis.

Such columns may be used for mass transfer processes, i.e. the sorption of antibiotics on ion exchangers. In such cases, the liquid may be an unfiltered fermentation suspension, which under certain circumstances has been fed through a coarse screen. The liquid is fed upward through the sorbent and at the end of the sorption the sorbent is washed until the suspension is displaced. The product now contained in the column, is eluated in the known ordinary way by means of diluted acids, basis, buffers, complexing agents, etc. This elution may even be carried out by oscillations as this procedure, as mentioned, contributes to give a good chromatographic effect.

In addition, sorption from unfiltered liquids makes it possible to carry out a continuous sorption from fermentation liquids drawn from the fermentation process and thereafter returned for further fermentation. In such cases sterilizing equipment is added to the sorption unit.

EXAMPLE I

The ion exchange column consists of a Pyrex glass tube ($\phi$ 2.5 x L 40 cm.) wrapped with PVC-tape to 30 mm. diameter, 2 cm. from each end and filled with rollbearings. The oscillations approx. 5 Hz., 60° angle, are transformed from the crank shaft on an excentric, movable bearing on a swing wheel (moved via a cone belt with a variable speed motor) to a bearing on a bar, mounted to the column. The column was filled to a height of 3 cm. with glass globes ($\phi$ 1 mm.) on 30 mesh sieve, then with 110 ml. IRC–50 ion exchanger (measured at pH 5.4). The column was regenerated with 1 N-ammonia, 1 N-hydrochloric acid, washed with water and the pH was adjusted to 5.4 by recirculating 1 N-ammonium acetate under addition of conc. ammonia.

Damaged and too small ion exchange spheres, about 5%, were removed during ½ hour by a quick upward washing with water at 6 Hz. and oscillations at 60° angle. Approx. 5% was further removed by pumping upward bacitracin fermentate (which had previously been absorbed twice) as mentioned above. By this procedure physical and chemical unfavourable ion exchange spheres were removed.

The bacitracin fermentate which contained 232 U./ml. was diluted with 2 parts of water and screened on a 50 and 80 mesh sieve. The material thus separated was washed with one part of water. 2470 ml. of the screened and diluted fermentate (1 p. fermentate and 3 pts. water) containing 58 U./ml. bacitracin were pumped upward on the column (flow-rate 4.5 ml./min. and by about 5 Hz./60° angle oscillations).

The solid particles passed easily through the resin without the tendency to form channels, aggregates or giving any filter effect on the resin.

Above the ion exchanger a reasonable, quiet suspension without much tendency to whirl up the resin was obtained. The solid particles moved easily out of the column with the liquid.

The column was washed upward with 500 ml. of water until the column was free from particles. By elution downward with 1 N-ammonia using the same flow rate, the yield was 10,400 U=73% bacitracin in the eluate.

The effluent from the first absorption, 2250 ml. containing 14 U./ml.+400 ml. wash water, was absorbed on the same column (after regeneration and adjusting the pH to 5.4) as above. This second effluent contained about 0.6 U./ml.

The elution with 1 N-ammonia gave an eluate containing 27,000 U. bacitracin. The total yield was then 131,000 U. or 91% on the resin column from not filtered fermentate and the loss in the effluent was less than 1%.

Experiments with other concentrations of bacitracin in the fermentate and with infected fermentate gave similar results.

It is likely that the bacitracin will be absorbed in good yield on a single, tall production column.

EXAMPLE II

A 2″ column, equipped for oscillation as the 1′ column was used. The height of IRC–50 was 14 cm., but otherwise the conditions were similar as described in Example I. The effluent I resulted in a loss of 13.5 U./ml. bacitracin, and the effluent No. 2 gave a loss of 0.6 U./ml. by about 4 Hz./50° angle oscillation.

It could thus be demonstrated that the absorption capacity was approx. the same on doubling the column diameter.

EXAMPLE III

This experiment was carried out with "stirring" rods in the 2″ column (see Example No. 2). The stirring rods were mounted to a central shaft of 1 mm. acid proof steel wire, covered with ⅛″ nylon tubes and connected to the upper column packing. On this shaft ⅛″ nylon tubes were welded on both sides along the shaft at 25 mm. distance, and mounted in 90° angle to each other. The stirring rods reached the column wall and the ends were closed by welding. To avoid whirling at the top of the sorbent, the stirring rods were adjusted to leave a free space of ½ column diameter on each side of the top.

The bacitracin fermentate was absorbed as described in Example II. After reabsorption (as earlier mentioned) effluent I gave a loss of 14 U./ml., and effluent II only 0.5 U./ml. A local movement of the sorbent around the stirring rods was yielded, but this has not reduced the number of the theoretical exchange steps of the column to any noticeable degree.

EXAMPLE IV

Neomycin fermentate was adjusted to pH 6, diluted with the equal amount of water, then screened on a 50 and 80 mesh sieve and washed with another volume of water. In order to obtain a satisfactory rate of sedimentation of IRC–50, another volume of water was finally added.

The sieved and diluted neomycin fermentate was absorbed on IRC–50 in the ammonia form (using the same column as mentioned in Example I), where unfavourable ion-exchange spheres were removed. The flow-rate was 270 ml./h. at approx. 4 Hz. and an angle of 60°.

Although it was absorbed from 4600 ml. with 550 γ/ml. and under a loss of 0.5% in effluent. After the washing with 450 ml. of water (upward) the neomycin was eluted downwards with 1 N-ammonia resulting in approx. 95% yield.

EXAMPLE V

Not filtered but diluted and sieved bacitracin fermentate of pH 8 was absorbed on 120 ml. Amberlyst 15 in the ammonia form, using an oscillating column ($\phi$ 2.5 x L 40 cm.) at 5 Hz./60° and at a flow-rate of 270 ml./h. When the fermentate contained 90 U./ml. then 30 U./ml. could be found in the effluent. The bacitracin was eluted with 0.5 N-ammonia.

EXAMPLE VI

To the nystatin fermentate was added sodium lauryl sulphate (2 g./l.), the pH was adjusted to 5.5 with 2 N-sulfuric acid and then diluted with 2 parts of water. The fermentate was sieved through a 50 mesh sieve and afterwards through a 80 mesh sieve. Finally it was washed with 1 part of water. The oscillating column ($\phi$ 2.5 x L 40 cm.) was filled with XAD–2 (110 ml., a macro-porous, polymer sorbent) and approx. 10% of the too small sorbent spheres and those with an unfavourable form and chemical property were washed out, similar to the method as being described under Ex. 1.

The fermentate (2000 ml.) was pumped via the bottom of the column (flow-rate: 5 ml./minute at 5 Hz./60°). The column was washed upward with water (300 ml.), and the nystatin was eluted downward with 75% alcohol. The solvent was evaporated under vacua and crystals were obtained.

On this scale the yield can be increased on using more solvent for nystatin or by reabsorption. On an enlarged scale (i.e. production-) the height of the column used is decisive for the alternation of solvent or alternatively reabsorption in order to obtain better yields.

What is claimed is:

1. A method for the sorption of an antibiotic from unfiltered liquids using at least one vessel having an inlet and an outlet for said liquids and filled with sorbent particles for the antibiotic which comprises continuously feeding said unfiltered liquids into said vessel by means of said inlet, oscillating said vessel containing said sorbent particles horizontally around its own axis to provide horizontal movement with minimal axial movement to the sorbent particles and withdrawing effluent reduced in antibiotic concentration from said vessel by means of said outlet.

2. A method as claimed in claim 1, wherein several sorbent containing vessels are employed and said vessels oscillate horizontally around a common axis.

3. A method as claimed in claim 1 wherein the oscillation amplitude ranges from angles of 0.01° to several rotations in each direction and the frequency of the oscillation ranges from 0.01 to 200 c.p.s.

4. A method as claimed in claim 2 wherein the oscillation amplitude ranges from angles of 0.01° to several rotations in each direction and the frequency of the oscillation ranges from 0.01 to 200 c.p.s.

5. A method as claimed in claim 1 wherein the sorbent vessel is a cylindrical column.

References Cited

UNITED STATES PATENTS

| 2,970,943 | 2/1961 | Bromer et al. | 424—124 X |
| 3,221,008 | 11/1965 | Wolf et al. | 424—124 X |
| 3,432,149 | 3/1969 | Stalberg et al. | 259—75 |
| 3,491,021 | 1/1970 | Huntington | 210—19 |

REUBEN FRIEDMAN, Primary Examiner

T. G. WYSE, Assistant Examiner

U.S. Cl. X.R.

195—134; 210—24; 424—124